United States Patent
Nama et al.

(10) Patent No.: US 8,953,529 B2
(45) Date of Patent: Feb. 10, 2015

(54) METHOD, SYSTEM AND DEVICE FOR HIGH SPEED UPLINK PACKET ACCESS SCHEDULING

(75) Inventors: Hithesh Nama, San Jose, CA (US); Amit Butala, Sunnyvale, CA (US); Sayandev Mukherjee, Santa Clara, CA (US)

(73) Assignee: SpiderCloud Wireless, Inc., San Jose, CA (US)

( * ) Notice: Subject to any disclaimer, the term of this patent is extended or adjusted under 35 U.S.C. 154(b) by 1064 days.

(21) Appl. No.: 12/953,330

(22) Filed: Nov. 23, 2010

(65) Prior Publication Data
US 2011/0128926 A1 Jun. 2, 2011

Related U.S. Application Data

(60) Provisional application No. 61/265,711, filed on Dec. 1, 2009.

(51) Int. Cl.
*H04L 12/28* (2006.01)
*H04W 4/00* (2009.01)
*H04W 72/00* (2009.01)
*H04W 72/12* (2009.01)

(52) U.S. Cl.
CPC ...... *H04W 72/1252* (2013.01); *H04W 72/1268* (2013.01)
USPC ........... 370/329; 370/227; 370/230; 370/242; 370/252; 370/278; 370/318; 370/230.1; 370/338; 370/341; 370/468; 370/412; 455/450; 455/454; 455/63.1

(58) Field of Classification Search
CPC ..... H04W 72/08; H04W 24/02; H04W 52/34; H04W 52/42; H04W 52/24; H04W 12/06; H04W 52/286; H04W 72/1205; H04W 52/346; H04W 52/48; H04W 72/0413; H04W 5/0007; H04L 12/5693; H04L 47/6215; H04L 47/525; H04L 47/521; H04L 5/0046; H04L 5/006; H04L 5/0094; H04L 63/04; H04L 63/107; H04L 63/162; H04L 1/1822; H04L 1/1887; H04L 5/0053; H04L 27/2601; H04L 25/365; H04L 72/0406
USPC .................................................. 370/228–463
See application file for complete search history.

(56) References Cited

U.S. PATENT DOCUMENTS

| | | | |
|---|---|---|---|
| 5,497,382 A | 3/1996 | Levine et al. | |
| 7,155,236 B2 * | 12/2006 | Chen et al. | 455/454 |
| 7,447,504 B2 * | 11/2008 | Lohr et al. | 455/450 |

(Continued)

OTHER PUBLICATIONS

International Search Report for PCT Application No. PCT/US10/57881.

*Primary Examiner* — Venkatesh Haliyur
(74) *Attorney, Agent, or Firm* — AlbertDhand LLP

(57) ABSTRACT

A method, apparatus and computer program product comprises determining a rise-over-thermal (RoT) budget associated with a cell within a communication network for user equipment served by the cell, determining a number of user equipment served by the cell to receive a minimum-grant of an uplink channel, determining a high-grant for allocation to a selected user equipment, the high-grant allowing the selected user equipment to communicate in the uplink channel of the communication network, the high-grant being based on the RoT budget, and allocating the high-grant to the selected user equipment and the minimum-grant to all other user equipment served by the cell.

36 Claims, 5 Drawing Sheets

(56) References Cited

U.S. PATENT DOCUMENTS

| | | | |
|---|---|---|---|
| 7,580,392 B2* | 8/2009 | Yang et al. | 370/331 |
| 7,693,156 B2* | 4/2010 | Liljestrom et al. | 370/395.4 |
| 7,804,850 B2* | 9/2010 | Sebire et al. | 370/468 |
| 7,941,144 B2* | 5/2011 | Nylander et al. | 455/435.1 |
| 8,213,957 B2* | 7/2012 | Bull et al. | 455/456.1 |
| 8,259,693 B2* | 9/2012 | Lohr et al. | 370/338 |
| 8,260,207 B2* | 9/2012 | Srinivasan et al. | 455/63.1 |
| 8,284,728 B2* | 10/2012 | Andersson | 370/329 |
| 8,307,205 B2* | 11/2012 | Cha et al. | 713/166 |
| 8,310,921 B2* | 11/2012 | Cho et al. | 370/229 |
| 8,358,614 B2* | 1/2013 | Pani et al. | 370/328 |
| 8,391,796 B2* | 3/2013 | Srinivasan et al. | 455/63.1 |
| 8,400,935 B2* | 3/2013 | Pelletier et al. | 370/252 |
| 8,412,103 B2* | 4/2013 | Srinivasan et al. | 455/63.1 |
| 8,432,811 B2* | 4/2013 | Park et al. | 370/236 |
| 8,526,966 B2* | 9/2013 | Chen et al. | 455/454 |
| 8,565,146 B2* | 10/2013 | Zhang et al. | 370/318 |
| 8,649,389 B2* | 2/2014 | Fox et al. | 370/412 |
| 2006/0120404 A1* | 6/2006 | Sebire et al. | 370/469 |
| 2006/0176856 A1* | 8/2006 | Yang et al. | 370/331 |
| 2006/0286994 A1 | 12/2006 | Kwak et al. | |
| 2007/0047451 A1* | 3/2007 | Lohr et al. | 370/242 |
| 2007/0248099 A1* | 10/2007 | Liljestrom et al. | 370/395.4 |
| 2007/0254620 A1 | 11/2007 | Lindqvist et al. | |
| 2008/0049669 A1* | 2/2008 | Lundby et al. | 370/329 |
| 2009/0034487 A1* | 2/2009 | Lohr et al. | 370/335 |
| 2009/0168793 A1* | 7/2009 | Fox et al. | 370/412 |
| 2009/0196174 A1* | 8/2009 | Ji | 370/230.1 |
| 2010/0008325 A1* | 1/2010 | Hartman et al. | 370/331 |
| 2010/0034163 A1* | 2/2010 | Damnjanovic et al. | 370/329 |
| 2010/0067467 A1* | 3/2010 | Cho et al. | 370/329 |
| 2010/0093355 A1* | 4/2010 | Voyer et al. | 455/436 |
| 2010/0157895 A1* | 6/2010 | Pani et al. | 370/328 |
| 2010/0195640 A1* | 8/2010 | Park et al. | 370/350 |
| 2010/0273504 A1* | 10/2010 | Bull et al. | 455/456.1 |
| 2010/0303030 A1* | 12/2010 | Andersson | 370/329 |
| 2011/0128926 A1* | 6/2011 | Nama et al. | 370/329 |
| 2011/0141960 A1* | 6/2011 | Liu et al. | 370/311 |
| 2011/0176593 A1* | 7/2011 | Hultell et al. | 375/224 |
| 2011/0205997 A1* | 8/2011 | Chun et al. | 370/329 |
| 2011/0222499 A1* | 9/2011 | Park et al. | 370/329 |
| 2012/0002630 A1* | 1/2012 | Bergman et al. | 370/329 |
| 2012/0115522 A1* | 5/2012 | Nama et al. | 455/501 |
| 2012/0188960 A1* | 7/2012 | Hultell et al. | 370/329 |
| 2013/0107730 A1* | 5/2013 | Ankel et al. | 370/252 |

* cited by examiner

METHOD, SYSTEM AND DEVICE FOR HIGH SPEED UPLINK PACKET ACCESS SCHEDULING

RELATED APPLICATIONS

This application claims the benefit of priority to provisional patent application 61/265,711, filed Dec. 1, 2009.

FIELD OF INVENTION

The present invention relates generally to the field of wireless communications. More particularly, the present invention relates to scheduling for high speed uplink packet access protocol.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

High Speed Packet Access (HSPA) is a protocol used within Wideband Code Division Multiple Access (WCDMA) and it comprises two mobile telephony protocols: High Speed Downlink Packet Access (HSDPA) and High Speed Uplink Packet Access (HSUPA). HSPDA and HSUPA extend and improve the performance of existing WCDMA protocols by improving the capacity and throughput while reducing latency. In particular, HSUPA provides fast uplink packet switch data services in the uplink direction with a shorter Transmission Time Interval (TTI) and Hybrid ARQ (HARM) with incremental redundancy, which makes retransmissions more effective. In HSUPA, the Enhanced Dedicated Physical Data Channel (E-DPDCH) and the Enhanced Dedicated Physical Control Channel (E-DPCCH) are provided to carry the uplink packet data and the associated control information, respectively.

HSUPA also uses a packet scheduler that operates on a request-grant basis, where at any given time, a number of User Equipments (UEs) may request a permission to send data in the uplink direction. In response, the HSUPA scheduler allocates radio resources on the uplink to the requesting UEs by keeping a tight control on the total received power (or equivalently, Rise-over-Thermal (RoT)). The amount of data that a UE can transmit depends on the transmit power grant allocated to that UE by the HSUPA scheduler. The higher the grant, the more data a UE can transmit.

SUMMARY OF THE INVENTION

The present invention relates to systems, methods, devices, and computer program products for an HSUPA scheduler that has a high uplink throughput and improved low data rate packet latency, while at the same time is robust to interference in the presence of multi-cell user traffic and retransmissions. One aspect of the present invention relates to a method comprising selecting one or more user equipment served by a cell within a communication network for allocation of a high-grant of an uplink channel in the communication network; and allocating a high-grant to the one or more selected user equipment the high-grant allowing the one or more selected user equipment to communicate in the uplink channel of the communication network.

In one embodiment, the method further comprises allocating a minimum-grant of the uplink channel to at least some of the other user equipment served by the cell.

In one embodiment, the method further comprises determining the high-grant for allocation to the one or more selected user equipment. The determining the high-grant may be based on a rise-over-thermal (RoT) budget associated with the cell for user equipment served by the cell. The determining the high-grant may comprise determining a rise-over-thermal (RoT) budget associated with the cell for user equipment served by the cell, determining a number of user equipment served by the cell to receive the minimum-grant, and determining the high-grant for allocation to the one or more selected user equipment.

In one embodiment, the high-grant is determined in accordance with the total rise over thermal, the minimum-grant and the number of user equipment to receive the minimum-grant, while in a another embodiment, at least the selecting of the one or more user devices for allocation of the high-grant is carried out during each transmission time interval. In one embodiment, a different user equipment is selected for high-grant allocation for contiguous transmission time intervals. The duration of the allocation may be configurable. In yet another embodiment of the above-described method, the minimum-grant allows the communication of one protocol data unit per transmission time interval.

In one embodiment of the present invention related to the above method, the communication network comprises one or more femtocells, and in one embodiment, one or more user equipment with allocated minimum-grants are de-allocated to allow minimum-grant allocation to one or more different user equipment. In another embodiment, the high-grant is adjusted to accommodate variations in the RoT budget. In still another embodiment, the minimum-grant allocated to one or more user equipment is temporarily reduced to accommodate variations in RoT budget. In one embodiment, a Happy bit or TEBS or LUPR is utilized for selecting, allocating or deallocating the high-grant and the low-grant to the user equipment served by a cell, while in another embodiment, the high-grant is reduced to accommodate soft handover of one or more user equipment not currently being served by the cell.

According to one embodiment of the present invention, the high-grant is reduced to accommodate a rise in RoT caused by uplink retransmission by a user equipment, other than the selected user equipment, as a result of a failure in an original uplink transmission. In another embodiment, the high-grant is allocated to a selected user equipment to accommodate uplink retransmission by the selected user equipment as a result of a failure in an original uplink transmission. According to a different embodiment, the high-grant is reduced to accommodate an anticipated change in RoT budget, and in another variation, the anticipated change in RoT budget is ascertained by early decoding of an uplink control information.

Another aspect of the present invention relates to an apparatus comprising a processor, and a memory comprising program code, the program code configured to work with the apparatus and cause the apparatus to select one or more user equipment served by a cell within a communication network for allocation of a high-grant of an uplink channel in the communication network and allocate a high-grant to the one or more selected user equipment the high-grant allowing the one or more selected user equipment to communicate in the uplink channel of the communication network.

Another aspect of the present invention relates to a computer program product, embodied on a computer readable medium, comprising program code for selecting one or more user equipment served by a cell within a communication network for allocation of a high-grant of an uplink channel in the communication network, and program code for allocating a high-grant to the one or more selected user equipment the high-grant allowing the one or more selected user equipment to communicate in the uplink channel of the communication network.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF CERTAIN EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

Figure 1:
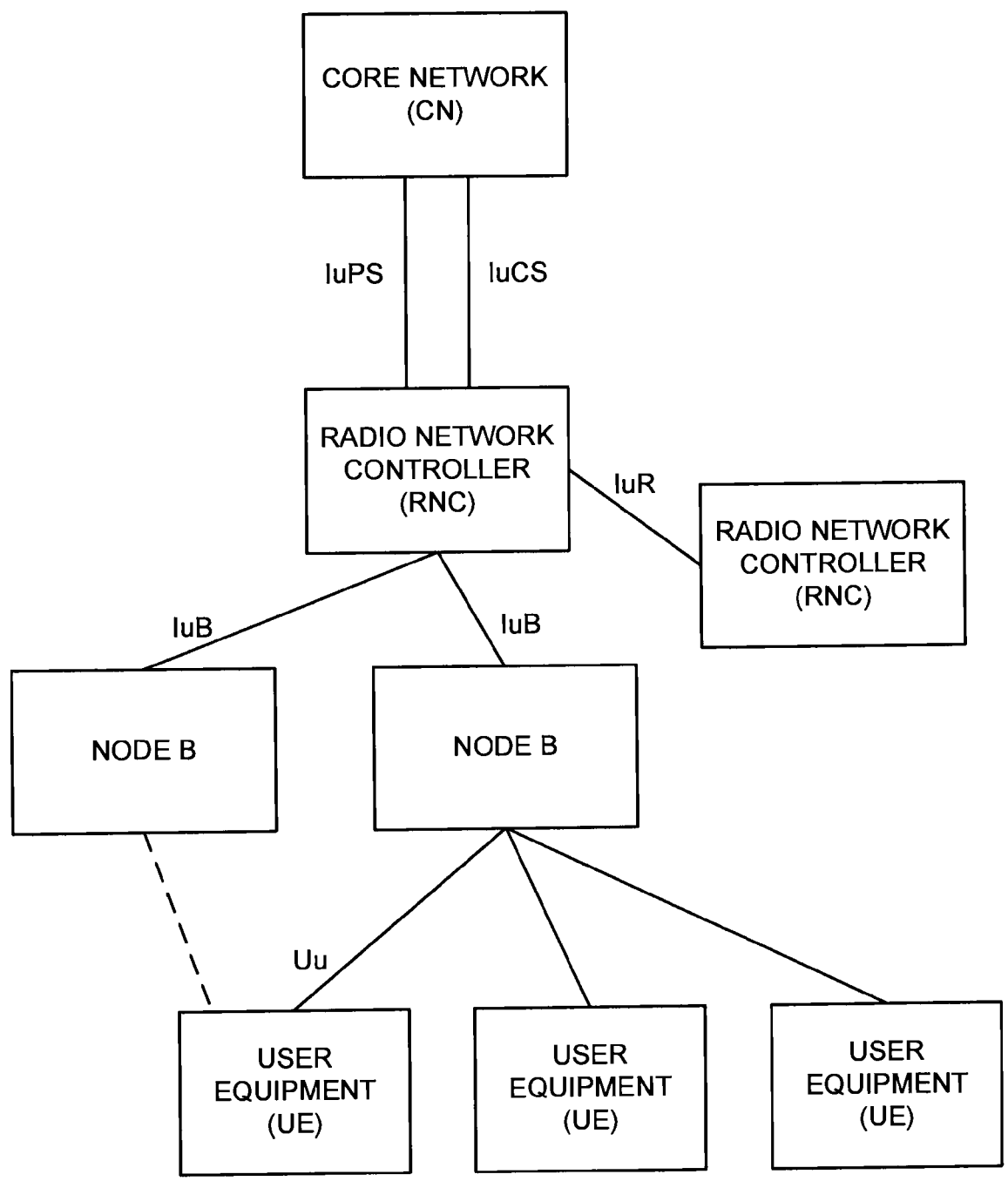
FIG. 1 illustrates a radio network for use with various embodiments of the present invention.

FIG. 1 is a diagram of a radio network, such as a Universal Mobile Telecommunication System (UMTS) Terrestrial Radio Access Network (UTRAN), within which the various embodiments of the present invention may be implemented. The network that is depicted in FIG. 1 comprises a Core Network (CN), one or more Radio Network Controllers (RNC) that are in communication with a plurality of Node B or base stations and other RNCs. Each Node B is in communication with one or more UEs. There is one serving cell controlling the serving radio link assigned to each UE. The serving cell controls the scheduling process and provides the absolute grant to the UE. However, as illustrated in FIG. 1 with a dashed line, a UE may be in communication with more than one Node B. For example, Node B of a neighboring cell may communicate with one or more UEs of the current cell during soft handoffs and/or to provide overload indications.

Figure 2:
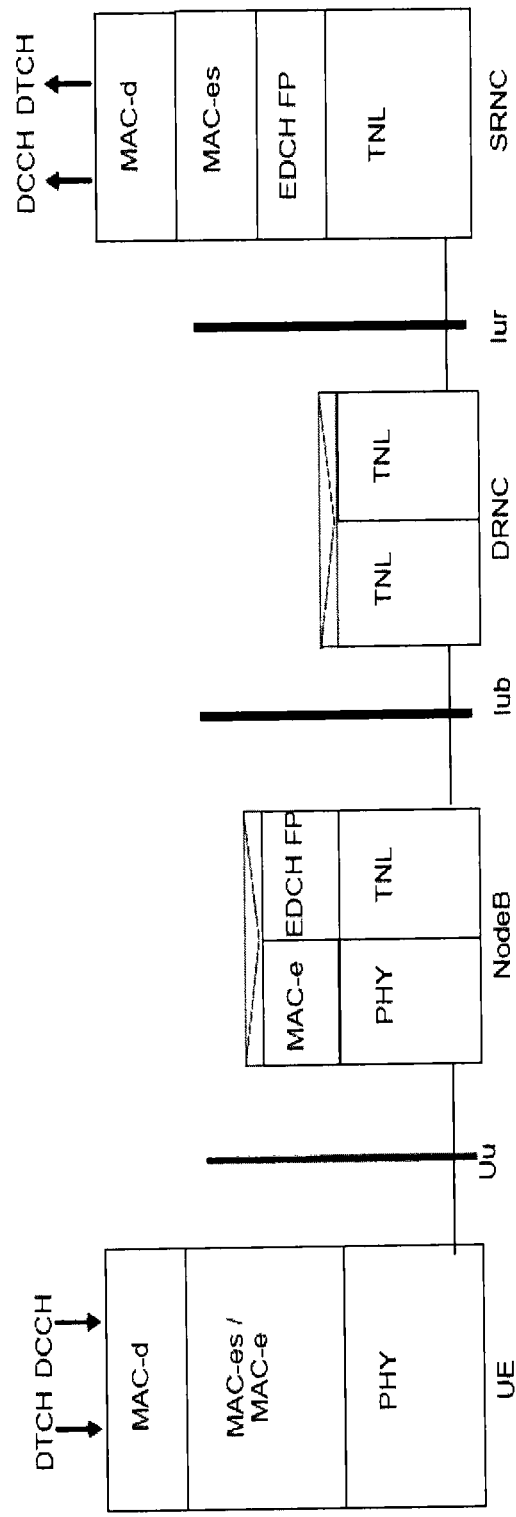
FIG. 2 illustrates a protocol architecture for use with the various embodiments of the present invention.

FIG. 2 illustrates a protocol architecture that reflects the HSUPA-related functionalities. The Medium Access Control (MAC) entity (MAC-es/MAC-e) at the UE handles HARQ retransmissions, scheduling and MAC-e multiplexing, and E-DCH TFC selection. The MAC entity at the Node-B (MAC-e) handles HARQ retransmissions, scheduling, and MAC-e demultiplexing. The MAC entity (MAC-es) at the Serving RNC (SRNC) provides in-sequence delivery (reordering) and handles combining of data from different Node-Bs in case of soft handover. The HSUPA scheduler is located at the Node B and is responsible for controlling the uplink resources that are allocated to UEs in the cell.

An important aspect of providing enhanced uplink services is fine-grained uplink power allocation per-TTI basis. This is done by adjusting the Serving Grant (SG) for each UE in every TTI. The serving grant is an internal state variable in a UE and is the maximum permissible E-DPDCH-to-DPCCH power ratio. Control of this entity is equivalent to control of the total transmit power of a UE. The serving grants are allocated in response to scheduling requests sent from the UE's. There are two control mechanisms that are delivered through specific downlink control channels to adjust the serving grant—the Absolute Grant Channel (AGCH) and the Relative Grant Channel (RGCH). The AGCH is a shared downlink channel and may be used to address a specific UE or a group of UE's through the use of an Enhanced Radio Network Temporary Identity (E-RNTI). A cell may use the AGCH to control UEs for which it is the serving cell. The RGCH is a dedicated physical downlink channel, and as such, may be used to individually target UE's. The RGCH may be used to control UEs served by the current cell, as well as UEs served by neighboring cells. In the latter scenario, the RGCH simply serves as an 'overload' indicator to request non-served UEs to power down. The use of AGCH and RGCH to achieve a robust scheduling strategy that also results in high system capacity is an extremely complex operation.

It is worth noting that UE's are allowed to transmit certain types of information without formally requesting a scheduling grant. These include the transmission of Scheduling Information messages, Signaling messages, and low latency traffic such as voice-over IP (VoIP). Non-scheduled transmissions can be restricted to certain HARQ processes by the NodeB HSUPA Scheduler.

For scheduled transmissions, the HSUPA Scheduler is made aware of queue states at the requesting UEs through scheduling requests, which can take two forms: (a) the "Happy Bit," which is communicated through the E-DPCCH and (b) the "Scheduling Information" messages, which are sent on the E-DPDCH.

The Happy bit provides an indication as to whether or not the UE is happy with its current Serving Grant. The definition of Happy, for a UE on an HSUPA call is whether it can empty its buffers within the Happy Bit Delay Condition period using the Serving Grant. A UE on an HSUPA considers itself "unhappy" if it is using its entire serving grant and if it has enough power to transmit a bigger mac-e transport block and if at the current rate it cannot empty its buffers within the happy bit delay condition period.

A Scheduling Information message comprises 4 parts: (1) Highest priority Logical channel ID (HLID), which unambiguously identifies the highest priority logical channel with available data; (2) Total E-DCH Buffer Status (TEBS), which identifies the total amount of data available across all logical channels for which reporting has been requested by the RRC and indicates the amount of data in number of bytes that is available for transmission and retransmission in RLC layer; (3) Highest priority Logical channel Buffer Status (HLBS), which indicates the amount of data available from the logical channel identified by HLID; and (4) UE Power Headroom (UPH), which indicates the ratio of the maximum UE transmission power and the corresponding DPCCH code power.

The primary task of the scheduler is to optimize the per-cell throughput while managing the link latency from each UE and the total rise-over-thermal (RoT) at a cell. The RoT is indicative of ratio of the total power received from UEs at a Node B in a cell to the thermal noise. The RoT may be characterized by Equation (1):

$$RoT_{Total} = RoT_{R99} + RoT_{ServingHSUPA} + RoT_{NonServingHSUPA} + RoT_{External} \quad (1)$$

where, $RoT_{Total}$ represents the total RoT measured at the receive antenna, $RoT_{R99}$ represents the RoT than can be attributed to non-HSUPA transmissions from other users that are known to the cell, $RoT_{ServingHSUPA}$ represents the RoT from users that are served by the cell, $RoT_{NonServingHSUPA}$ is the RoT from users that are decodable by the cell but are not served by it, and $RoT_{External}$ is any unaccounted RoT that are attributed to other UEs in the network that are not known to the cell. It should be noted that Equation (1) represents the RoT in linear scale (i.e., the RoT's are not in decibels). Of the four quantities that are present on the right-hand side of Equation (1), only the $RoT_{ServingHSUPA}$ can be influenced by the HSUPA scheduler. This control is exerted when the scheduler signals the serving grant to the served and non-served UEs over the common HSUPA downlink channels. However, as is evident from Equation (1), for a given $RoT_{Total}$, the ROT budget that is associated with $RoT_{ServingHSUPA}$ is also affected by fluctuations in the remaining terms of Equation (1). For the HSUPA scheduler, the ROT budget available for scheduling is the value of $RoT_{servedHSUPA}$ that satisfies equation (1).

According to one embodiment of the present invention, a programmable number of UEs may be provided with a minimum-grant. All the other UEs, apart from the ones with the high-grant (as will be described in the sections that follow), get a zero grant. The number of UEs with minimum-grant may be varied as needed to optimize the cell throughput and link latency. In particular, a finite number of UEs may be selected to receive simultaneous minimum-grants, thus providing an upper bound on the number of UE's that can simultaneously communicate at minimum-grant levels. As a result, the radio resources that may have been allocated to some or all UEs with no anticipated uplink usage may now be distributed to one or more UEs in the network.

The minimum-grant value could be set such that it is sufficient to allow the transmission of TCP ACKs or bursty payload, both of which are delay sensitive. For example, the minimum-grant value may be set such that it permits a UE to transmit one protocol data unit (PDU) in every TTI. The average link latency is a function of the number of UEs that are concurrently transmitting. The assignment of a minimum-grant to the UEs improves the latency for low rate bursty traffic. This improvement is attributed to the UEs not requiring to transmit control signaling to request a data grant prior to transmission of data and also due to the acquisition of quicker grants by UEs. In addition, UEs that require low rate data transmission may be quickly switched in and out of the set of UEs with minimum-grants. For example, the switching may be carried out by sending RGCH DOWN commands to several minimum-grant UEs at once. However, there is a cost associated with cell throughput when a large number of UEs are given a minimum-grant. As such, the assignment of the minimum-grant provides the opportunity to finely balance the total cell throughput, the maximum number of users that can be concurrently supported, and the latency for low rate traffic. The balancing of the above-noted factors is effected by setting an upper bound on the number of UEs that have the minimum-grant and switching the UEs in and out of this set.

In one embodiment, the remaining RoT budget is channeled into a single high-grant to any one UE through precise timing control. This results in a scheduling scheme that is similar to Time Division Multiplexing (TDM) and results in the most efficient use of the channel when the transmit power is not constrained. For example, such a scenario may exist in a femtocell environment. A single parameter, namely the high-grant, is used to keep the RoT under control. To this end, if the measured RoT (i.e., $RoT_{Total}$ in Equation (1)) is too high, the high-grant can be reduced to bring RoT within acceptable levels, and conversely, if the measured RoT is too low, the high-grant may be increased. The high-grant is a function of the number of UEs that are connected to the Access Point (AP). It is chosen to be the largest value that allows proper operation of all UEs with the allocated minimum-grant and one UE with the high-grant, without producing RoT spikes that exceed an particular RoT threshold.

In another embodiment, more than one user can be allocated a high-grant. While such an allocation can typically be expected to degrade the cell throughput, it would result in an reduction of average link latency for user equipment in the cell. In cases having more than one user being allocated a high-grant, the value of the high-grant may be determined for each of the users. Thus, while two or more users may be allocated a high-grant, each of those users may have a different value of the allocated high-grant.

Figure 3:
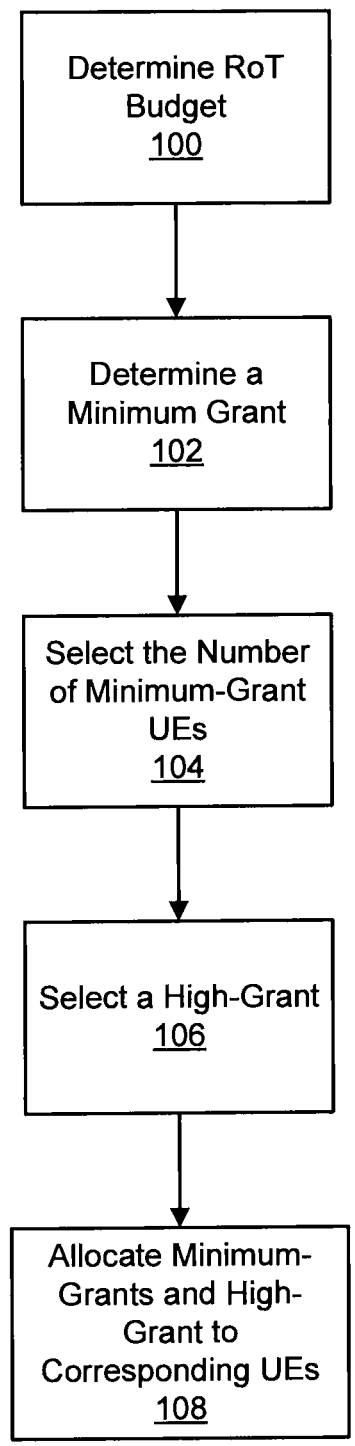
FIG. 3 illustrates a flow diagram for allocating grants in accordance with an example embodiment of the present invention.

FIG. 3 provides a block diagram illustrating the above-noted procedure for allocating the RoT among different UE's in accordance with an embodiment of the present invention. In Step 100, the RoT budget is determined. This can be accomplished by, for example, measuring the total RoT and/or determining the various components associated with the total RoT that are described in Equation (1). In Step 102, a level of minimum-grant is determined. As noted earlier, the minimum-grant may be set to allow the transmission of one PDU per TTI. In Step 104, the number of UEs with minimum-grant are selected. This step may, for example, comprise identifying specific UEs or all UEs in the cell. It should be noted that Step 104 may be carried out before, or simultaneously with, Step 102. In Step 106, a high-grant value is selected based, in-part, on the minimum-grant, the number of UEs and the RoT budget associated with the cell. In certain embodiments, the value of the high-grant may be based on an estimate of the interference of the user equipment on the neighboring cells. In Step 108, the grant levels are allocated among the identified UEs. The operations that are carried out in Steps 102 to 108 of FIG. 3 may be repeated for each TTI. Alternatively, some or all of the operations in Steps 102 to 108 may not be repeated for each TTI. For example, if the system parameters, such as the number and status of UEs and the RoT budget, are unchanged since the last iteration of Steps 102 to 108, no modifications may be necessary.

As noted earlier, a Happy bit provides an indication to the scheduler as to whether or not an UE requires more resources. According to an embodiment of the present invention, the Happy bit delay condition may be tuned to enable a UE's request for the high-grant. To this end, the Happy bit may be unset (i.e., set to "Unhappy" state) only when a UE has more data that can be efficiently communicated using the minimum-grant. For example, the Happy bit delay condition may be set sufficiently high so that only UEs with significant amount of data produce an "Unhappy" state that triggers a high-grant request. This way, the number of high-grant requests, as well as the resources that are necessary for granting such requests, are reduced. On the other hand, if the Happy bit delay condition is set too high, the latency associated with UEs with moderate data loads are increased since these UEs are forced to operate at minimum-grant levels. Therefore, the tuning of the Happy bit delay condition must be carried out to strike a balance between these two competing conditions.

Another feature of the present invention relates to the ability to reduce the number of served UE grants for a short duration in response to an RoT spike. Since there is only one UE with high-grant and a known number of UEs with minimum-grants, it is possible to predict the anticipated RoT status of the system at a future time. As such, if an RoT spike is anticipated, one or more UEs, from the set of served of UEs, may be quelled to mitigate the impact of the anticipated RoT spike. Quelling, as used herein, is described in the paragraphs that follow.

By the way of example, and not by limitation, the following two scenarios illustrate how the HSUPA scheduler of the present invention may be utilized to mitigate RoT spikes.

In a first scenario, the RoT spike is attributed to a UE that is attempting a soft-handover (SHO) for which the current cell is a non-serving cell. The spike in RoT may, therefore, occur when this UE transmits with a high traffic-to-pilot (T/P) ratio. In such a scenario, an option is provided to signal a non-serving RGCH (ns-RGCH) to provide a serving grant update procedure. However, the ns-RGCH loop has a very large turn around time and the serving grant can only be reduced by a small amount with an ns-RGCH (i.e., the step-size is low). As such, while the interfering UE is still backing off to reach its permissible interference levels, in-cell signaling can be used to temporarily constrain the high-grant UE until the RoT spike has diminished.

The second scenario relates to the RoT spikes that are generated due to high-grant retransmissions. When a UE, other than the current high-grant UE, has a CRC failure and is about to retransmit, the current high-grant UE may be provided with a minimum-grant in order to prevent simultaneous high-grant transmissions that would result in an RoT spike. At the end of the high-grant retransmission, the current high-grant UE may be again signaled to allow transmissions using the high-grant.

Figure 4:
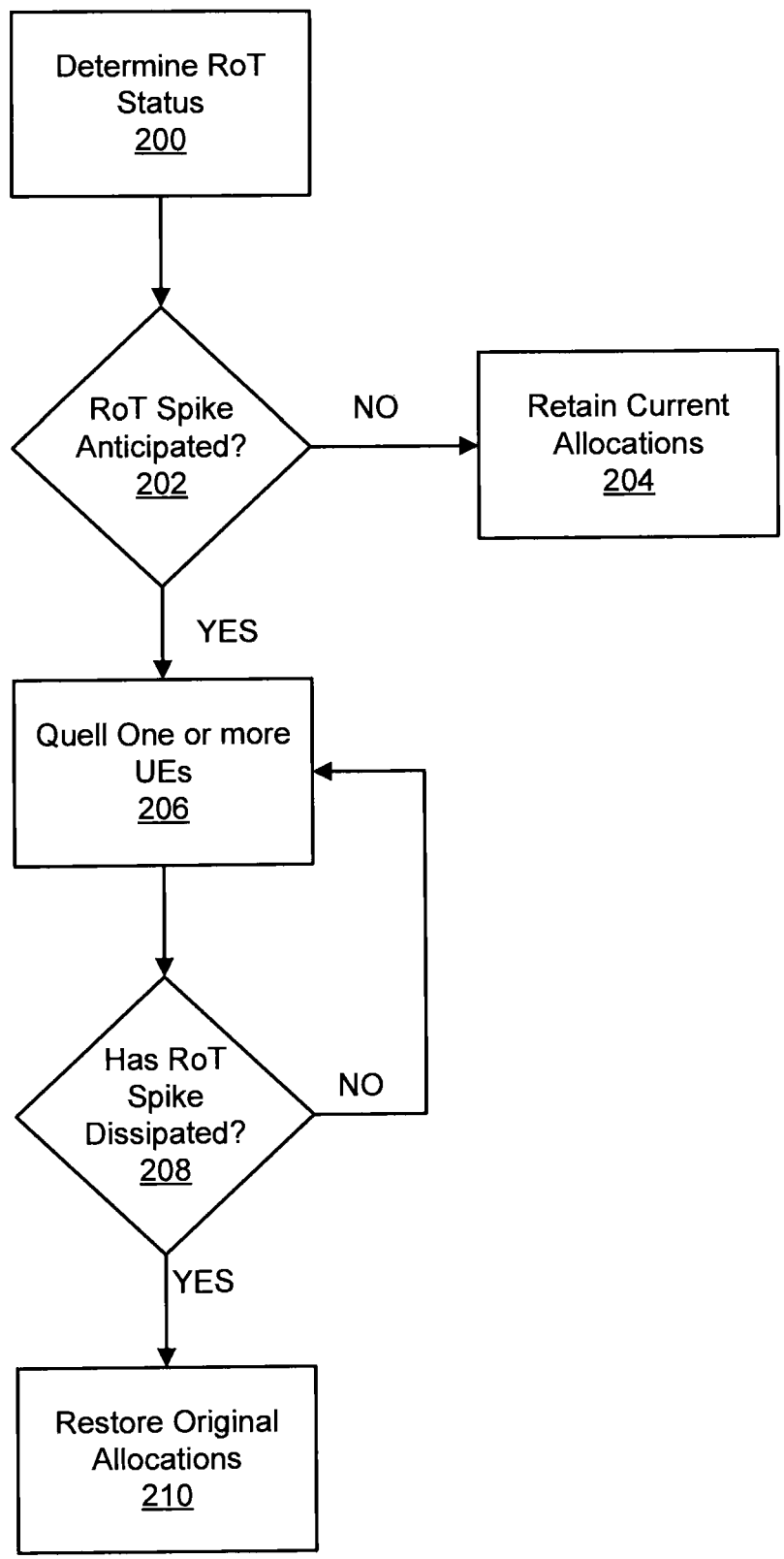
FIG. 4 illustrates a block diagram of an example embodiment of the present invention.

FIG. 4 illustrates the above-noted operations that are carried out in accordance with the various embodiments of the present invention in response to the detection of an anticipated RoT. In Step 200, the status of RoT is determined. Based on this determination, in Step 202 is it determined whether or not an RoT spike is anticipated. If a rise in RoT is not anticipated, the current allocations to the various UEs are retained in Step 204. On the other hand, if an RoT spike is anticipated, one of more UEs are quelled in Step 206. Next, in Step 208, it is determined if the RoT spike has dissipated. If the spike still remains, the process returns to Step 206, where the same or different UEs are quelled. However, if the RoT spike has dissipated, the original allocations to the various UEs are restored.

In various embodiments, quelling of the UEs may include reducing the grant level to a reduced amount. The reduced amount may be predetermined or may be variable based on one or more parameters. Further, in some embodiments, the reduced amount may result in a grant that is greater than zero. Thus, the UE is still provided a certain grant. In other embodiments, the grant may be eliminated altogether.

Another aspect of the present invention relates to the early decode of 10 ms E-DPCCH to reduce ns-RGCH reaction time. The E-DPCCH, which carries the uplink control information, is repetition encoded. As such, the HSUPA scheduler can be made aware of the T/P ratio of the incoming signal after decoding the first chunk of the repetition-coded information. Knowing this information, the scheduler can discern if an RoT overhead is likely to occur. Thus, the interference management mechanisms can be kicked off early before the entire uplink packet is received and decoded.

Another aspect of the present invention relates to AGCH prioritization. Typically, the role the HSUPA scheduler is restricted to prioritizing user data based on Quality of Service (QOS) or channel quality. In this case, given the restrictions on the AGCH, (e.g., limited numbers of AGCH over a large number of users and the inability to signal an arbitrary set of users concurrently on one AGCH. Typically only one user can be signaled on one AGCH in one transmit interval), the HSUPA scheduler may be used to prioritize the AGCH usage. For example, the AGCH that is used for the RoT spike mitigation may take the highest priority, followed by the minimum-grant scheduling. In this regard, minimum-grant scheduling may include selecting and/or switching user equipment selected for allocation of the minimum-grant. If none of these tasks are scheduled, the AGCH can then be used to re-point the UE that has the high-grant. Thus, in certain embodiments, selecting and/or switching of user equipment selected for allocation of the high-grant may take the lowest priority.

The HSPUA scheduler of the present invention also provides the ability to detect and recover from a situation where an UE has made an error in interpreting its available grant. In the absence of the mechanisms that are present in the scheduler of the present invention, when a UE misinterprets its grant to comprise a higher value than the allocated amount, a very sudden interference in the network may occur, leading to dropped calls and other adverse consequences in the network. However, since the scheduler of the present invention has to only manage a single high-grant user, the detection and recovery mechanisms are greatly simplified despite the above-mentioned constraints on the AGCH. For example, based on the Transport Format Combination Identifier (E-TFCI) transmitted by a UE that was allocated a minimum-grant, the scheduler may determine if the UE has falsely decoded a high-grant, and if so, quell that UE by re-sending a minimum-grant to prevent an RoT spike.

Further, the precise timing of high-grant allocation allows a tight control on RoT fluctuations. In particular, there are no RoT spikes associated with transitioning the high-grant from one UE to another. This smooth transition is made possible since, at no time during the transition, both UEs simultaneously transmit with a high-grant. Further, since the number of minimum and high-grant UEs are known, by taking advantage of the AGCH and the RGCH channel application times, it may be possible to transmit an extra RGCH uplink command, and/or to receive an extra PDU from one of UEs, every time the high-grant is switched across users. For example, when the high-grant transition from UE1 to UE2 occurs over two TTIs, a low-grant AGCH may be sent to UE1 in the first TTI and a high-grant AGCH may be sent to UE2 in the second TTI. During the first TTI, UE2 can receive an RGCH UP command to increase its serving grant by a small amount that is sufficient to transmit at least one extra PDU.

The scheduler of the present invention further provides awareness of non-served UEs. As noted earlier, the RGCH may be used to control UEs served by neighboring cells by providing an 'overload' indicator to request non-served UEs to power down. A cell can infer that its served UE has received an ns-RGCH "down" command in a previous TTI. This inference is based on the detection of an unhappy bit even though the UE is neither power constrained, nor is transmitting at its maximum grant level. When such conditions are detected, the scheduler of the present invention may rapidly reduce grant of its served UE in order to assist the neighboring cell in controlling its RoT levels. By the way of example, and not by limitation, the one of more served UEs that were inferred as being ns-controlled are given a lower grant to reduce interference at the neighboring cell(s). Further, once the RoT spikes from the neighboring cells are brought under control, the scheduler may slowly modulate the grant associated with the inferred ns-controlled UEs until the point where no ns-RGCH commands are issued by the neighboring cells. As such, the scheduler of the present invention can be used to exert grant power control over different UEs.

Figure 5:
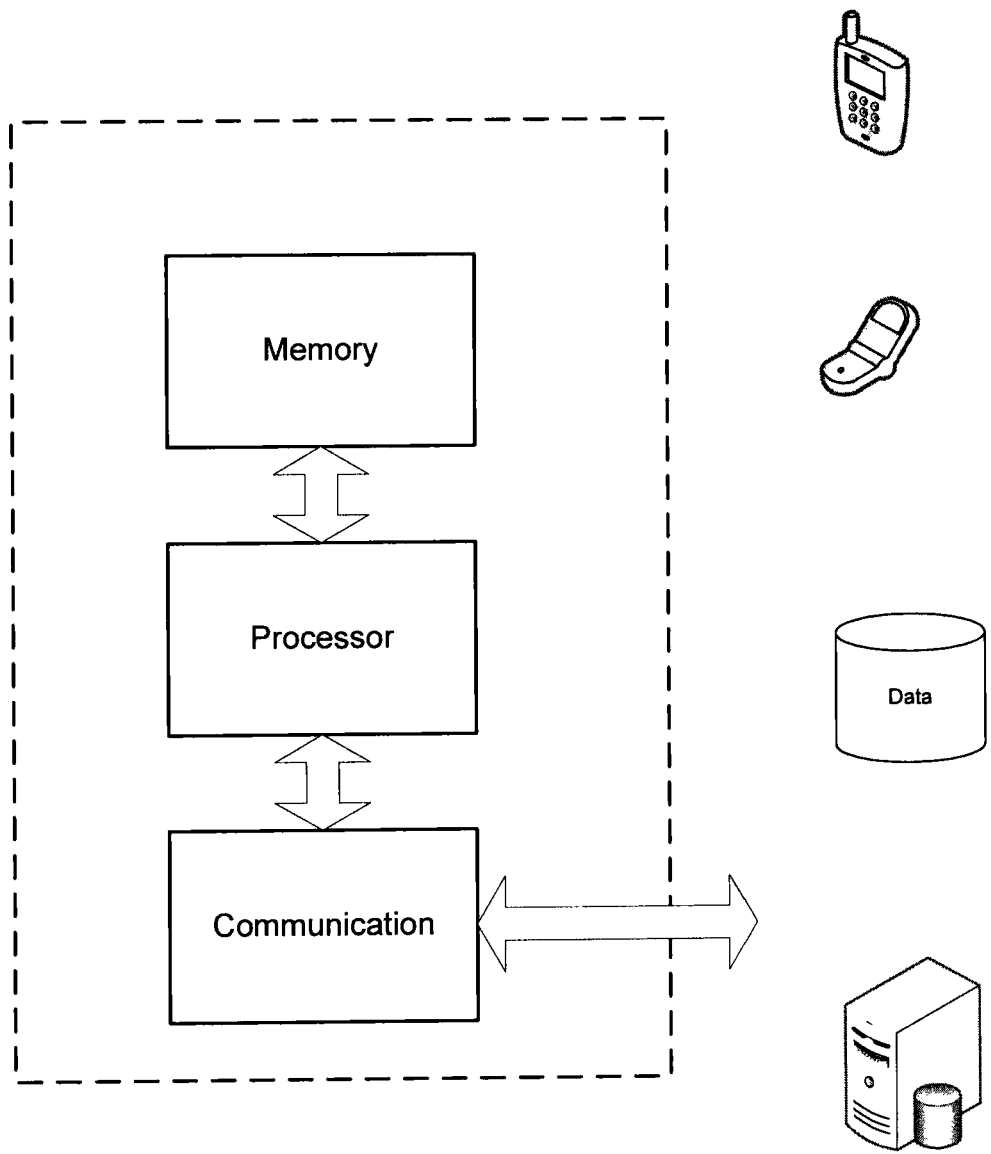
FIG. 5 illustrates a block diagram of an example device for implementing the various embodiments of the present invention.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 5 illustrates a block diagram of a device within which the various embodiments of the present invention may be implemented. The device comprises at least one processor and/or controller, at least one memory unit that is in communication with the processor, and at least one communication unit that enables the exchange of data and information, directly or indirectly, with other entities and devices. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. The exemplary device that is depicted in FIG. 1 may be integrated into Node B hardware or may reside as a separate component within or outside Node B of a radio network.

Similarly, the various components or sub-components within each module of the present invention may be implemented in software, hardware, firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. For example, it may be possible to designate more than one UE to simultaneously receive a high-grant. However, in such a case, the high-grant that is simultaneously allocated to the UEs is likely smaller than the level associated with a single UE scenario. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   selecting a first one or more user equipment served by a cell within a communication network for allocation of a minimum-grant of an uplink channel of the communication network;
   selecting a second one or more user equipment served by the cell for allocation of a high-grant of the uplink channel in the communication network;
   allocating a high-grant to the second one or more selected user equipment the high-grant allowing the second one or more selected user equipment to communicate in the uplink channel of the communication network;
   signaling allocation of the high-grant to the second one or more selected user equipment;
   determining that at least one of the user equipment has falsely decoded an allocation of a grant higher than the one signaled to the user equipment; and
   quelling the at least one of the user equipment that has falsely decoded the allocation of the higher-grant by resending the desired grant allocation thereto.

2. The method of claim 1, wherein a number of user equipment selected for allocation of the high-grant is statically or dynamically configurable based on network conditions.

3. The method of claim 1, further comprising:
   allocating the minimum-grant of the uplink channel to at least some user equipment served by the cell.

4. The method of claim 1, further comprising:
   allocating the minimum-grant of the uplink channel to the first one or more user equipment selected for allocation of the minimum grant; and
   signaling allocation of the minimum grant to the first one or more user equipment selected for allocation of the minimum grant.

5. The method of claim 1, wherein a number of user equipment selected for allocation of the minimum-grant is statically or dynamically configurable based on network conditions.

6. The method of claim 1, further comprising:
   determining a value of the high-grant for allocation to each of the user equipment selected for allocation of the high-grant.

7. The method of claim 6, wherein the determining the high-grant is based on a rise-over-thermal (RoT) budget associated with the cell for user equipment served by the cell.

8. A method, comprising:
   selecting a first one or more user equipment served by a cell within a communication network for allocation of a minimum-grant of an uplink channel of the communication network;
   selecting a second one or more user equipment served by the cell for allocation of a high-grant of the uplink channel in the communication network;
   allocating a high-grant to the second one or more selected user equipment the high-grant allowing the second one or more selected user equipment to communicate in the uplink channel of the communication network;

determining a rise-over-thermal (RoT) budget associated with the cell for user equipment served by the cell;

determining a number of user equipment served by the cell to receive the minimum-grant;

determining a value of the high-grant for allocation to each of the user equipment selected for allocation of the high-grant, wherein the determining the high-grant is based on the rise-over-thermal (RoT) budget associated with the cell for user equipment served by the cell; and signaling allocation of the high-grant to the second one or more selected user equipment.

9. The method of claim 6, wherein the determining the high-grant is based on an estimated interference of the user equipment on one or more neighboring cells.

10. The method of claim 6, wherein the determining the high-grant is based on the number of user equipment served by the cell to receive the minimum-grant.

11. The method of claim 6, wherein the determining the high-grant is based on the number of user equipment served by the cell to receive the high-grant.

12. The method of claim 1, wherein the high-grant is determined in accordance with the total rise over thermal, the minimum-grant and the number of user equipment to receive the minimum-grant.

13. The method of claim 1, wherein at least the selecting of the one or more user equipment for allocation of the high-grant is carried out during each transmission time interval.

14. The method of claim 1, wherein a different user equipment is selected for high-grant allocation for contiguous transmission time intervals.

15. The method of claim 14, wherein a duration of the high-grant allocation is either static or dynamically adjusted based on network conditions.

16. The method of claim 14, wherein the high-grant of a user equipment is de-allocated based on an indication of a buffer status.

17. The method of claim 14, wherein a Happy Bit, TEBS or LUPR is utilized for selecting, allocating or de-allocating the high-grant to a user equipment.

18. The method of claim 14, wherein a Happy Bit, TEBS or LUPR is utilized for selecting, allocating or de-allocating the minimum-grant to a user equipment.

19. The method of claim 1, wherein the minimum-grant allows the communication of one or more protocol data unit per transmission time interval.

20. The method of claim 1, wherein the communication network comprises one or more cells.

21. The method of claim 1, wherein the communication network comprises one or more femtocells.

22. The method of claim 1, wherein one or more user equipment with allocated minimum-grants are de-allocated to allow minimum-grant allocation to one or more different user equipment.

23. The method of claim 1, wherein the high-grant is adjusted to accommodate variations in RoT budget.

24. The method of claim 1, wherein the minimum-grant allocated to one or more user equipment is temporarily reduced to accommodate variations in RoT budget.

25. The method of claim 1, wherein the high-grant to the one or more selected user equipment is reduced to accommodate an estimated RoT from transmission of one or more user equipment that are in soft handover but not currently being served by the cell.

26. The method of claim 1, wherein the high-grant is reduced to accommodate an increase in interference caused by uplink retransmission by a user equipment, other than the selected user equipment, as a result of a failure in an original uplink transmission.

27. The method of claim 1, wherein the high-grant is allocated to a newly selected user equipment to accommodate uplink retransmission by the selected user equipment as a result of a failure in an original uplink transmission.

28. The method of claim 1, wherein the high-grant is reduced to accommodate an anticipated change in RoT budget.

29. A method, comprising:

selecting a first one or more user equipment served by a cell within a communication network for allocation of a minimum-grant of an uplink channel of the communication network;

selecting a second one or more user equipment served by the cell for allocation of a high-grant of the uplink channel in the communication network;

allocating a high-grant to the second one or more selected user equipment the high-grant allowing the second one or more selected user equipment to communicate in the uplink channel of the communication network;

wherein at least the selecting of the one or more user equipment for allocation of the high-grant is carried out during each transmission time interval, and further wherein, in a case in which a first UE is allocated a minimum-grant and a second UE is allocated a high-grant during a first transmission time interval, the method further comprising:

sending the first UE an increase allocation command to thereby increase its allocation by a predetermined amount to thereby allow the first UE to transmit at least one extra PDU within the first transmission time interval.

30. The method of claim 13, wherein, in the case of switching the high-grant from one UE to another UE, the method further comprising:

ensuring by a scheduler that at no time do more UEs than configured have a high-grant allocated thereto.

31. The method of claim 28, wherein the anticipated change in RoT budget is ascertained by early decoding of an uplink control information.

32. The method of claim 1, wherein signaling of allocation or de-allocation of a grant is prioritized based on importance of execution.

33. The method of claim 32, wherein switching user equipment for high-grant allocation is given lowest priority.

34. An apparatus, comprising
a processor; and
a memory comprising program code, the program code configured to work with the processor and cause the apparatus to:

select a first one or more user equipment served by a cell within a communication network for allocation of a minimum-grant of an uplink channel of the communication network;

select a second one or more user equipment served by the cell for allocation of a high-grant of the uplink channel in the communication network;

allocate a high-grant to the second one or more selected user equipment the high-grant allowing the second one or more selected user equipment to communicate in the uplink channel of the communication network; and determine a rise-over-thermal (RoT) budget associated with the cell for user equipment served by the cell;

determine a number of user equipment served by the cell to receive the minimum-grant;

determine the high-grant for allocation to the second one or more selected user equipment, wherein determining the high-grant is based on the rise-over-thermal (RoT) budget associated with the cell for user equipment served by the cell; and signal allocation of the high-grant to the second one or more selected user equipment.

35. The apparatus of claim 34, wherein the memory further comprises program code configured to work with the processor and cause the apparatus to:

allocate a minimum-grant of the uplink channel to all user equipment served by the cell not allocated a high-grant.

36. A computer program product, embodied on a non-transitory computer readable medium, comprising program code for selecting a first one or more user equipment served by a cell within a communication network for allocation of a minimum-grant of an uplink channel of the communication network;

program code for selecting a second one or more user equipment served by the cell for allocation of a high-grant of the uplink channel in the communication network;

program code for allocating a high-grant to the second one or more selected user equipment the high-grant allowing the second one or more selected user equipment to communicate in the uplink channel of the communication network;

program code for determining a rise-over-thermal (RoT) budget associated with the cell for user equipment served by the cell;

program code for determining a number of user equipment served by the cell to receive the minimum-grant;

program code for determining the high-grant for allocation to the second one or more selected user equipment based on the rise-over-thermal (RoT) budget associated with the cell for user equipment served by the cell;

program code for allocating a minimum-grant of the uplink channel to all user equipment served by the cell not allocated a high-grant; and program code for signaling allocation of the high-grant to the second one or more selected user equipment.

* * * * *